United States Patent
Westland et al.

(10) Patent No.: US 12,464,307 B2
(45) Date of Patent: Nov. 4, 2025

(54) TRANSLATION WITH AUDIO SPATIALIZATION

(71) Applicant: Meta Platforms Technologies, LLC, Menlo Park, CA (US)

(72) Inventors: Joy Westland, Seattle, WA (US); Amanda Barry, Kirkland, WA (US); Anjali Induchoodan Menon, Redmond, WA (US); Madeline Huberth, San Carlos, CA (US); Sangeetha Lalitha Ramachandran, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 246 days.

(21) Appl. No.: 18/132,851

(22) Filed: Apr. 10, 2023

(65) Prior Publication Data
US 2024/0340604 A1 Oct. 10, 2024

(51) Int. Cl.
*G06F 40/58* (2020.01)
*G06F 3/01* (2006.01)
(Continued)

(52) U.S. Cl.
CPC .............. *H04S 7/303* (2013.01); *G06F 3/013* (2013.01); *G06F 40/58* (2020.01); *G10L 15/26* (2013.01);
(Continued)

(58) Field of Classification Search
CPC .......... G06F 3/013; G06F 3/16; G06F 40/166; G06F 40/58; G06F 3/162; G06F 3/165; G06F 3/167; G06F 40/211; G10L 13/00; G10L 15/063; G10L 15/1822; G10L 15/22; G10L 15/26; G10L 21/003; G10L 25/18; H04L 12/1822; H04L 51/063; H04L 63/0428; H04L 43/18; H04R 3/005; H04R 5/02; H04R 5/027; H04R 25/405; H04R 27/00; H04R 5/04; H04S 7/303; H04S 7/304; H04S 2400/11; H04S 2400/13;
(Continued)

(56) References Cited

U.S. PATENT DOCUMENTS

| | | | |
|---|---|---|---|
| 5,899,971 A * | 5/1999 | De Vos .................. | G10L 15/063 704/275 |
| 6,275,789 B1 * | 8/2001 | Moser .................... | G06F 40/211 704/7 |

(Continued)

FOREIGN PATENT DOCUMENTS

CN 113286217 A 8/2021

OTHER PUBLICATIONS

European Search Report for European Patent Application No. 24162072.3, dated Jun. 14, 2024, 7 pages.

*Primary Examiner* — Gerald Gauthier
(74) *Attorney, Agent, or Firm* — Greenberg Traurig, LLP

(57) ABSTRACT

A method or an audio system for translation with audio spatialization. The audio system transcribes a first voice signal into first text in a first language. The first text is translated into second text in a second language. The audio system generates a second voice signal that corresponds to the second text in the second language. The first voice signal and the second voice signal are spatialized. The audio system presents the spatialized first voice signal and second voice signal to a user at a same time.

20 Claims, 9 Drawing Sheets

(51) Int. Cl.
  *G10L 15/26* (2006.01)
  *H04R 5/02* (2006.01)
  *H04S 7/00* (2006.01)

(52) U.S. Cl.
  CPC ............ *H04R 5/02* (2013.01); *H04S 2400/11* (2013.01); *H04S 2400/13* (2013.01)

(58) Field of Classification Search
  CPC ..... H04S 7/307; G06T 19/003; G06Q 20/321; G07C 9/33; G08B 25/004; H04B 7/24; H04M 3/56; H04M 3/568
  See application file for complete search history.

(56) References Cited

U.S. PATENT DOCUMENTS

| | | | | |
|---|---|---|---|---|
| 6,385,586 | B1* | 5/2002 | Dietz | G10L 13/00 |
| | | | | 704/277 |
| 9,301,057 | B2* | 3/2016 | Sprague | H04R 25/405 |
| 9,640,181 | B2* | 5/2017 | Parkinson | G06F 40/166 |
| 9,747,282 | B1* | 8/2017 | Baker | G06F 40/58 |
| 10,872,605 | B2* | 12/2020 | Adachi | G06F 40/58 |
| 11,328,131 | B2* | 5/2022 | Orlick | G10L 15/26 |
| 11,783,137 | B2* | 10/2023 | Tang | G10L 15/26 |
| | | | | 704/235 |
| 12,087,291 | B2* | 9/2024 | Park | G10L 15/1822 |
| 2002/0169592 | A1* | 11/2002 | Aityan | G06F 40/58 |
| | | | | 704/2 |
| 2003/0125927 | A1* | 7/2003 | Seme | H04L 51/063 |
| | | | | 704/3 |
| 2006/0285654 | A1 | 12/2006 | Nesvadba et al. | |
| 2008/0187143 | A1* | 8/2008 | Mak-Fan | H04R 5/027 |
| | | | | 381/17 |
| 2009/0080632 | A1* | 3/2009 | Zhang | H04M 3/56 |
| | | | | 379/202.01 |
| 2010/0198579 | A1* | 8/2010 | Cunnington | H04L 12/1822 |
| | | | | 704/3 |
| 2010/0235161 | A1* | 9/2010 | Kim | G10L 13/00 |
| | | | | 704/E11.001 |
| 2014/0142934 | A1* | 5/2014 | Kim | G10L 15/22 |
| | | | | 704/226 |
| 2016/0012465 | A1* | 1/2016 | Sharp | G06Q 20/321 |
| | | | | 705/14.17 |
| 2016/0275076 | A1* | 9/2016 | Ishikawa | G06F 40/58 |
| 2017/0286407 | A1* | 10/2017 | Chochowski | G06F 40/58 |
| 2018/0046431 | A1* | 2/2018 | Thagadur Shivappa | G06F 3/16 |
| 2018/0054400 | A1* | 2/2018 | Akopian | H04L 43/18 |
| 2019/0347331 | A1* | 11/2019 | Yu | G10L 15/26 |
| 2020/0134026 | A1* | 4/2020 | Lovitt | G10L 15/22 |
| 2020/0137006 | A1* | 4/2020 | Shannon | H04L 63/0428 |
| 2020/0142667 | A1* | 5/2020 | Querze | G06F 3/165 |
| 2020/0293622 | A1* | 9/2020 | Orlick | G10L 15/26 |
| 2021/0043066 | A1* | 2/2021 | Wright | G08B 25/004 |
| 2021/0160645 | A1* | 5/2021 | Olivieri | H04S 7/304 |
| 2021/0234611 | A1* | 7/2021 | Bull | H04B 7/24 |
| 2022/0022000 | A1* | 1/2022 | Bruhn | H04R 3/005 |
| 2022/0103963 | A1* | 3/2022 | Satongar | H04M 3/568 |
| 2022/0210531 | A1* | 6/2022 | Carlson | G06F 3/162 |
| 2022/0272477 | A1* | 8/2022 | Stein | H04R 27/00 |
| 2023/0093585 | A1* | 3/2023 | Faundez Hoffmann | G10L 25/18 |
| | | | | 704/200 |
| 2023/0114834 | A1* | 4/2023 | Chadwick | G06F 3/167 |
| | | | | 704/200 |
| 2023/0177948 | A1* | 6/2023 | Wright | G07C 9/33 |
| | | | | 340/539.26 |
| 2023/0186899 | A1* | 6/2023 | Waibel | G06F 40/166 |
| | | | | 704/2 |
| 2023/0209300 | A1* | 6/2023 | Udesen | H04S 7/307 |
| | | | | 381/310 |
| 2023/0300532 | A1* | 9/2023 | Spittle | G06F 3/165 |
| | | | | 381/1 |
| 2023/0368773 | A1* | 11/2023 | Mishra | G06F 3/167 |
| 2024/0056758 | A1* | 2/2024 | Kronlachner | H04S 7/303 |
| 2024/0311076 | A1* | 9/2024 | Balsam | G06F 3/013 |
| 2024/0340604 | A1* | 10/2024 | Westland | H04R 5/02 |
| 2025/0094211 | A1* | 3/2025 | Spittle | H04R 5/04 |

* cited by examiner

TRANSLATION WITH AUDIO SPATIALIZATION

FIELD OF THE INVENTION

This disclosure relates generally to near real time translation of voice signal from a first language to a second language, and more specifically to spatializing original and translated voices.

BACKGROUND

When people are traveling or communicating with a person who speaks a different language, they can employ a human translator. Alternatively, people may use a translation application (e.g., a mobile app) to try to capture what the other side is speaking. An existing translation application may generate some text and display the text to a user. It is often cumbersome to listen to people while reading the text on a display.

SUMMARY

The embodiments described herein provide an audio system for translation with audio spatialization. The audio system may provide near real time translation of an original voice signal in a first language to a translated voice signal in a second language. The audio system may spatialize the original voice signal and the translated voice signal, and present the spatialized original signal and translated voice signal to a user in near real time.

In some embodiments, the audio system may be configured to detect a first voice signal. The audio system may transcribe the first voice signal into first text in a first language, and translate the first text in the first language into second text in a second language. The audio system may generate a second voice signal that corresponds to the second text in the second language. The audio system may spatialize the first voice signal and the second voice signal and presents the spatialized first voice signal and the spatialized second voice signal.

In some embodiments, the audio system is configured to receive first text in a first language, and translate the first text in the first language to second text in a second language. The audio system may generate a first voice signal that corresponds to the first text in the first language, and generate a second voice signal that corresponds to the second text in the second language. The audio system may spatialize the first voice signal and the second voice signal, and presents the spatialized first voice and the second voice signal to a user.

In some embodiments, the audio system may present the spatialized first voice signal and the second spatialized voice signal sequentially or at the same time.

Figure 1A:
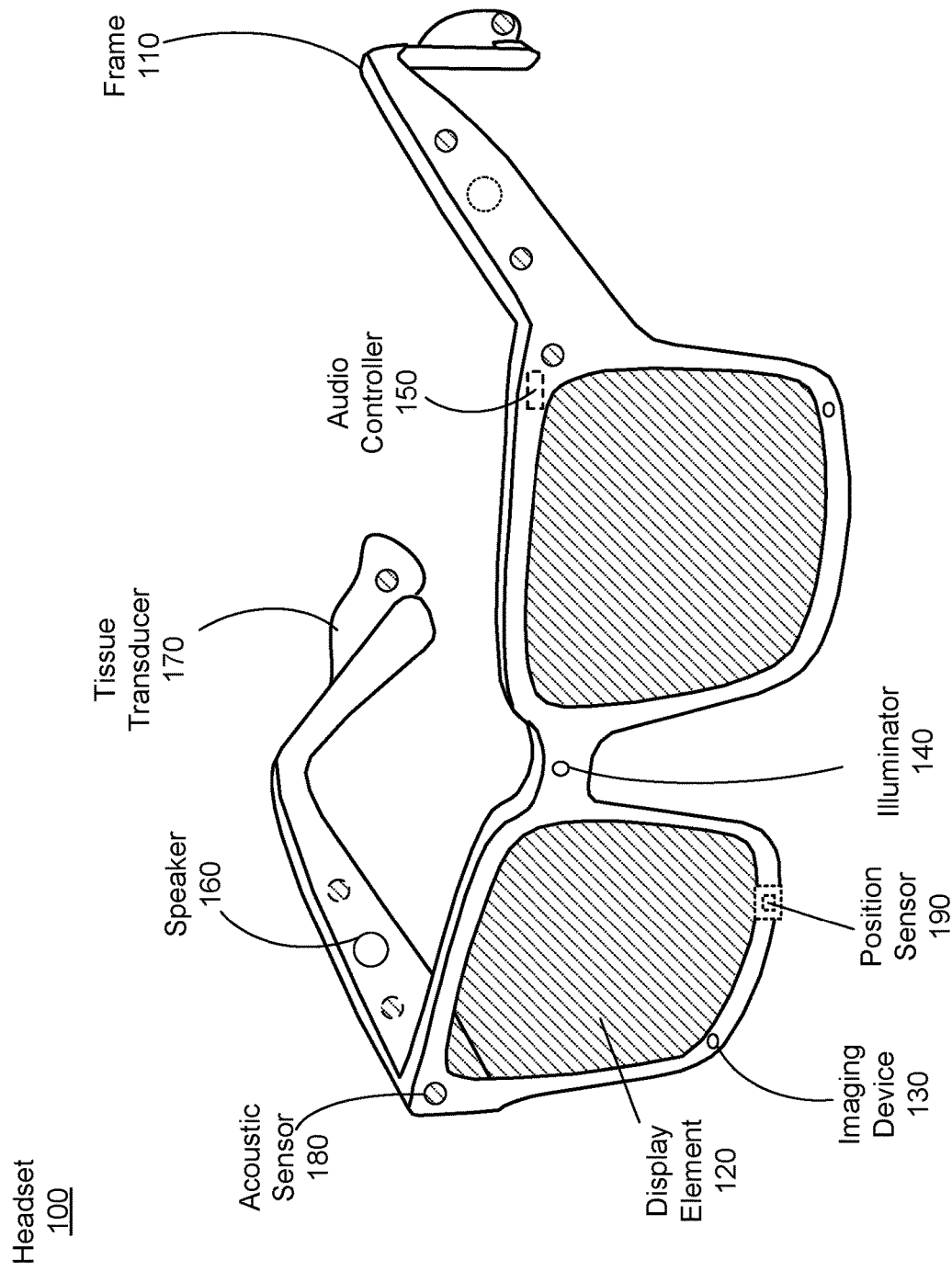
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

When people are traveling or communicating with a person who speaks a different language, they can employ a human translator. Alternatively, people may use a translation application (e.g., a mobile app) to try to capture what the other side is speaking. An existing translation application may generate some text and display the text to a user. It is often cumbersome to listen to people while reading the text on a display.

Embodiments described herein provide an audio system, a device (e.g., a headset), or a method for near real time audio translation, spatializing original voice and translated voice. In embodiments, the audio system blocks out most of the sounds around the user (e.g., via earsets that physically block the sound from reaching the ears of the user, and/or active noise cancellation), and selectively reprojects certain sound signals, such as voice signals to the user while generating additional sound signals, such as translated voice signals. For example, a user may be in a foreign country, where people speak a first language, while the user speaks a second language. The audio system receives (e.g., from a nearby person or device) a first voice signal and transcribes the first voice signal into first text in the first language. The audio system then translates the first text in the first language into second text in the second language, and generates a second voice signal that corresponds to the second text in the second language. The audio system spatializes the first voice signal and the second voice signal, and presents the spatialized first voice signal and the second voice signal to a user. The spatialized first voice signal and second voice signal may be presented sequentially or at the same time (e.g., a same time period). Note as used herein "at the same time" may also include cases where there is delay between a plurality of content (e.g., voice signal, translated voice signal, displayed text, displayed translated text, etc.) that is being presented over a same time period. For example, the spatialized first voice signal and the second voice signal may be presented at a same time—but be delayed (e.g., due to processing, ease of listening, etc.,) relative to each other. For instance, the spatialization may include spatializing the first voice signal to sound as if a source of the first voice signal were at a location further away from the user than a source of the second voice signal. In some embodiments, the first voice signal may not be rendered at all, and the second voice is spatialized as if it were to come from the sound source of the first voice signal.

In some embodiments, the audio system is further configured to receive multiple original voice signals, translate each of the multiple original voice signals to a separate translated voice signal, and spatialize the multiple translated voice signals based on sources of the original voice signals.

In some embodiments, the sources of original voice signals are physically near the user, e.g., in a same room. In such a real environment, the original voice signals may be detected by acoustic sensors of the audio system. In some embodiments, the sources of original voice signals are remote from the user, e.g., in a virtual conference or a gaming environment. In such a virtual environment, the original voice signals are received via a computer network from another device of another user.

In some embodiments, the audio system is also able to obtain first text in a first language, and translates first text in the first language into second text in a second language. The audio system generates a first voice signal that corresponds to the first text in the first language and generates a second voice signal that corresponds to the second text in the second language. Similarly, the generated first voice signal and second voice signal are spatialized and presented to a user sequentially or at a same time. The first text may be obtained from a text file, such as a webpage, a word document, an email, an e-book, etc. Alternatively, or in addition, the first text may be extracted from an image taken by an imaging device of the audio system, such as a street sign, a restaurant menu, a flyer, a screen, etc.

The embodiments described herein allow users to hear multiple voices in different languages sequentially or at a same time, while spatializing them such that the multiple voices would not interfere with each other. Users can adjust the spatialization based on their preferences. For example, a user who is more fluent in the foreign language may want to spatialize the original voice in the foreign language to be closer or louder. Alternatively, a user who is less fluent in the foreign language may want to spatialize the translated voice to be closer or louder. The audio system may help users to navigate in a foreign country, communicate with a foreigner, listen to foreign radio, watch foreign movies, and/or learn a foreign language.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information received from the sensor array, where the information describes sounds detected by the sensor array. For example, the sensor array may detect a voice signal (e.g., from a nearby person). The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof. When a sound source is a person, the audio controller 150 may be configured to track the person's location.

In some embodiments, the audio controller 150 receives a voice signal from another device, e.g., another headset 100 that is worn by another user. In some embodiments, the other device may be nearby, e.g., in the same room as the user, and the two devices are able to communicate with each other via a personal area network (e.g., Bluetooth) or a local area network (LAN). In some embodiments, the other device may be remote, e.g., in a virtual conference environment or a gaming environment. The two devices are able to communicate with each other via a wide area network (WAN).

Responsive to detecting a voice signal (also referred to a first voice signal), the audio controller 150 transcribes the first voice signal into first text in a first language. The audio controller 150 translates the first text in the first language into second text in a second language. The audio controller 150 generates a second voice signal that corresponds to the second text in the second language. The audio controller 150 spatializes the first voice signal and the second voice signal. The audio controller 150 causes the transducer array 210 to present the spatialized first voice signal and the second voice signal to a user. In some embodiments, the user is able to set spatialization parameters related to the first voice signal and the second voice signal. For example, the user may set spatialization parameters to cause the first voice signal to sound more remote than the second voice signal, or vice versa.

In some embodiments, the spatialized first and the second voice signals are presented to the user sequentially. Alternatively, the spatialized first and second voice signals are presented to the user at the same time. In some embodiments, the user can set a delay between the spatialized first and second voice signals, e.g., 1 second, 2 seconds, 5 seconds, etc., such that the second voice signal is presented after the first voice signal based on the set delay.

In some embodiments, the audio controller 150 automatically detects the first language based in part on the detected voice signal. In some embodiments, the first language is determined based on a current geolocation of the user. For example, the audio system may include a global positioning system (GPS) configured to detect the location. Alternatively, the audio system may be able to communicate with another mobile device of the user that has a GPS configured to detect the location. In some embodiments, the audio controller 150 automatically sets the second language based on the system language of the audio system. In some embodiments, the user may set the first language and the second language.

In some embodiments, the audio controller 150 further causes display elements 120 to display the transcribed text and/or the translated text. The original text and/or translated text may be presented in particular fonts or manner, e.g., size, color, side-to-side, or in parallel lines.

In some embodiments, the sensor array is configured to receive multiple original voice signals, and translate each of the multiple original voice signals into a translated voice signal. In some embodiments, the audio controller 150 is configured to spatialize the multiple translated voice signal based on sources of the original voice signals. In some embodiments, the audio controller 150 is configured to determine whether the user is looking at a particular source of a particular original voice signal based on eye tracking. Responsive to determining that the user is looking at a particular source of a particular original voice signal, the audio controller causes the particular original voice signal and/or the corresponding translated voice signal to sound louder than the other original voice signals and/or translated voice signals.

In some embodiments, the headset 100 is configured to receive first text in a first language. The headset 100 translates the first text in the first language into second text in a second language. The audio controller 150 generates a first voice signal based on first text in the first language, and generates a second voice signal based on second text in the second language. The audio controller 150 spatializes the first voice signal and the second voice signal, and presents the spatialized first voice signal and the second voice signal. In some embodiments, the spatialized first and second voice signals may be presented sequentially. Alternatively, the spatialized first and second voice signals may be presented at the same time.

In some embodiments, the first text may be obtained directly from a file, e.g., a text file, a webpage, an email, an e-book, etc. Alternatively, the first text may be obtained based on an image. The image may be obtained by the imaging device 130. The imaging device 130 may take an image of surrounding area, such as a road sign, a page of document, a computer screen, and extract text from the image. When the first text is obtained from a file, the headset 100 may further determine an author of the text, and select a voice based on the author of the text. In some embodiments, the author may be indicated in the text, and the headset 100 determines the author based on the text. In some embodiments, the author may be indicated in metadata of the text file, and the headset 100 determines the author based on the metadata. For example, if the author is a known author with a known voice, the headset 100 may be able to select a voice that is the closest to the author's voice. Alternatively, the user may map a particular author to a particular voice. When the headset 100 receives text authored by the particular author, the headset 100 automatically uses the user mapped voice for the author.

In some embodiments, when a document is provided by a particular person to the user, the headset 100 may select a voice based on facial identification of that particular person. The user may map the particular person to a particular voice. Once the headset 100 detects the particular person who is providing a document to the user, the headset 100 sets the voice to the user mapped voice for the particular person.

In some embodiments, the headset 100 causes display elements 120 to display the original text and translated text. The original text and/or translated text may be presented in particular fonts or manner, e.g., size, color, side-to-side, or in parallel lines.

Figure 1B:
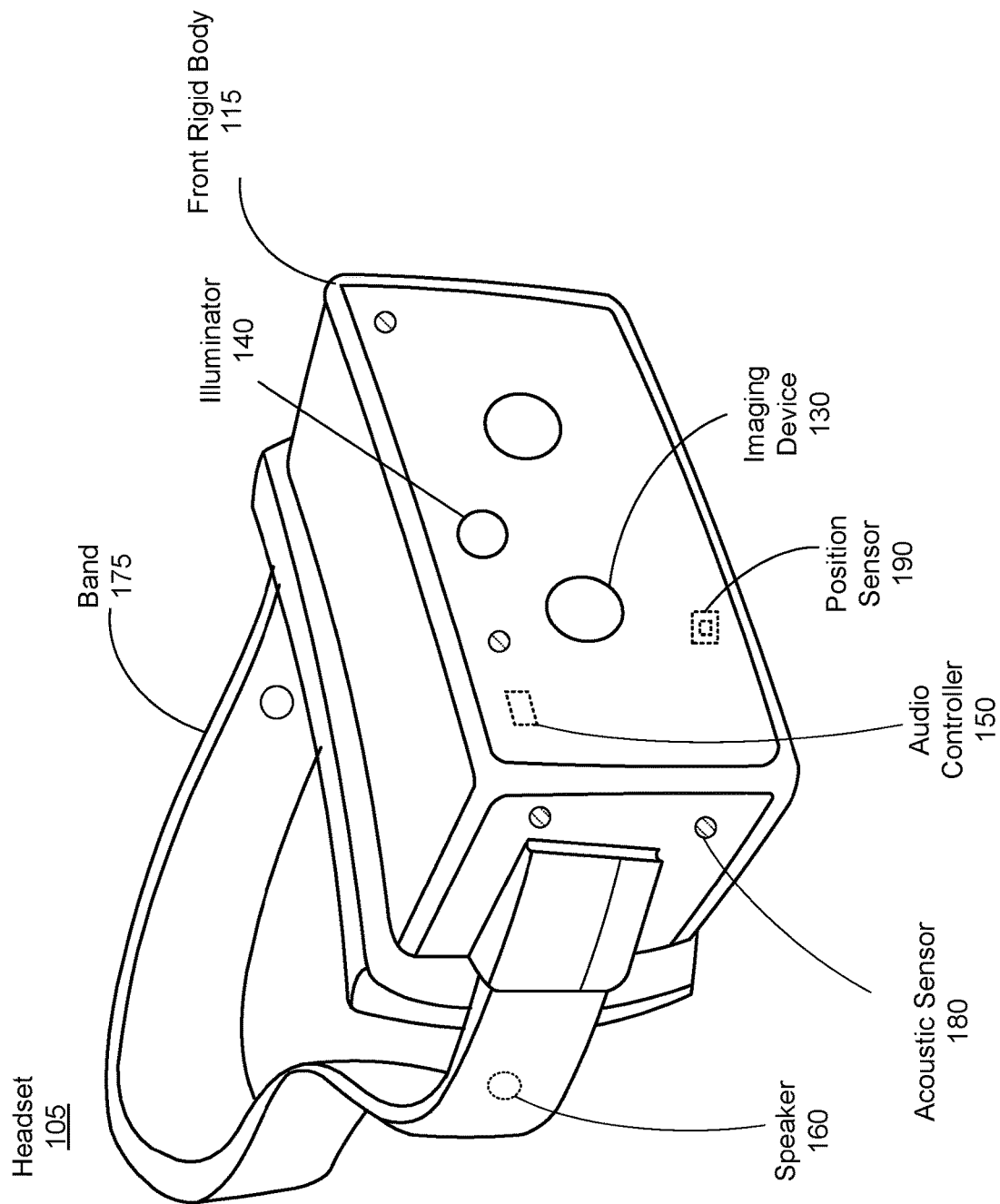
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
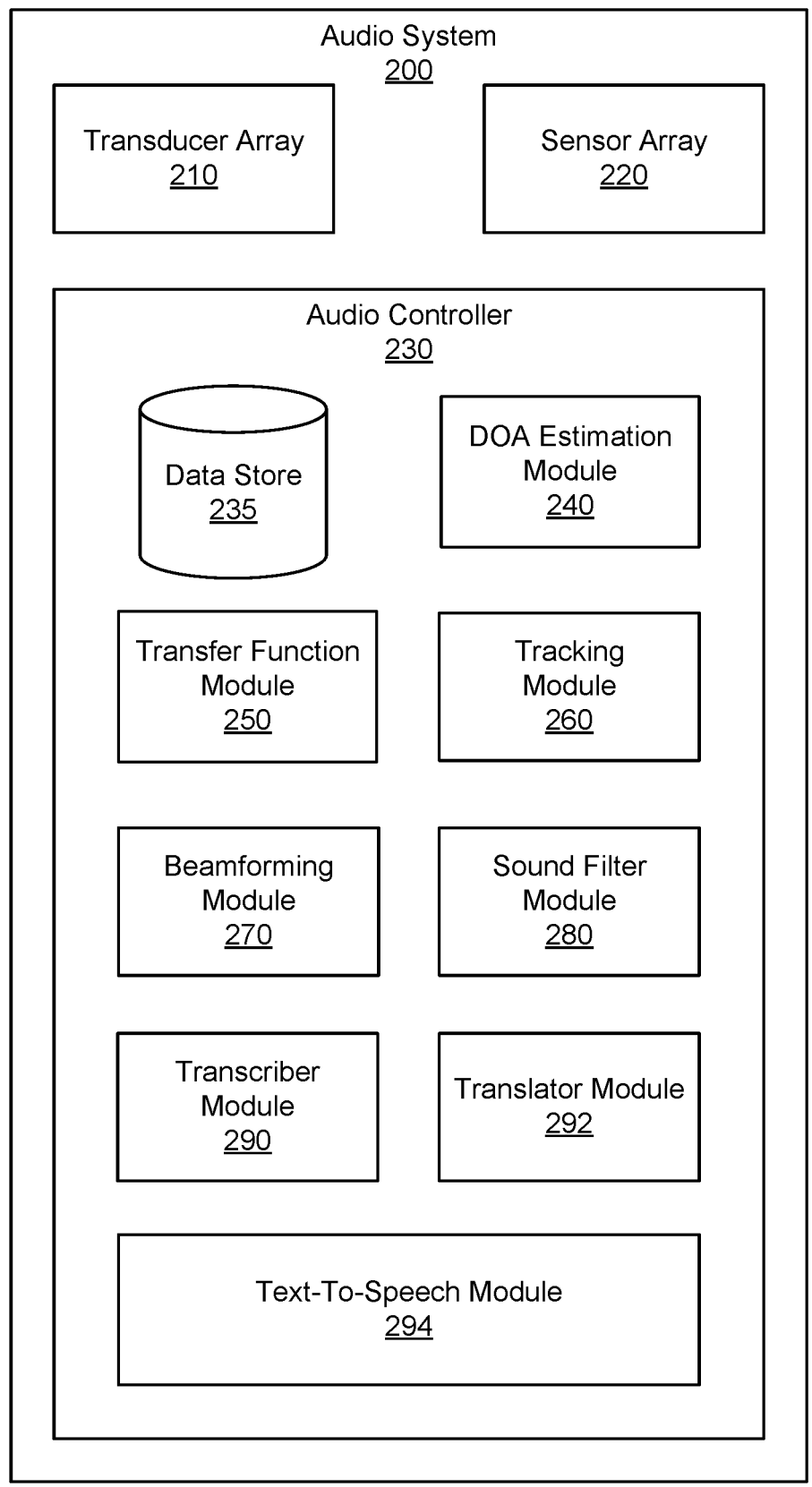
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based in part on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, a sound filter module 280, a transcriber module 290, a translator module 292, and a text-to-speech module 294. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, dictionaries, voice recognition models, and/or other machine learning models that are used by the transcriber module 290 and/or translator module 292 to transcribe original voice signal and/or translate text between different languages, different voice modules that are used by the text-to-speech module to generate translated voice signals, and other data relevant for use by the audio system 200, or any combination thereof.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based in part on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 7).

The sound filter module 280 provides the sound filters to the transducer array 210. In some embodiments, the sound filters may cause positive or negative amplification of sounds as a function of frequency.

The transcriber module 290 is configured to transcribe a voice signal into text in a particular language. In some embodiments, the transcriber module 290 uses machine learning models to perform transcription. For example, each language corresponds to a separate machine-learning model configured to transcribe a voice signal in that language. In some embodiments, the particular language may be detected by the transcriber module 290 based in part on the voice signal.

In some embodiments, the audio system 200 further includes a GPS configured to determine a current location of the audio system 200, and the first language is determined based in part on the geographical location of the audio system 200. For example, when the GPS detects that the current location of the audio system 200 is in Paris, France, the audio system 200 determines that the first language is French. Alternatively, or in addition, a user can set the first language. Once the first language is determined or set, the transcriber module 290 selects and applies a particular machine learning model corresponding to the first language to be used to transcribe the voice signal.

In some embodiments, the transcriber module 290 is configured to transcribe multiple original voice signals simultaneously. In some embodiments, the multiple voice signals may be in different languages. For example, a first original voice signal is in a first language, and a second original voice signal is in a second language. The transcriber module 290 is configured to apply a first machine learning module to the first original voice signal to transcribe it to text in the first language, and apply a second machine learning module to the second original voice signal to transcribe it to text in the second language. In some embodiments, when a voice signal is in a language that is same as a target language (e.g., a user's native language), the transcriber module 290 ignores that voice signal, such that voice signals in the target language are not further processed.

The translator module 292 is configured to translate the text generated by the transcriber module 290 into text in the target language, e.g., the user's native language. In some embodiments, the translator module 292 uses machine learning models to perform translation. For example, each pair of languages (e.g., English-French) correspond to a separate machine learning model, and the machine learning model is configured to translate text from one language to the other language in the pair.

The text-to-speech (TTS) module 294 is configured to generate a voice signal based in part on the translated text. There may be one or more separate TTS models for each language configured to convert text in that language into a voice signal in the same language. In some embodiments, for each language, there are multiple TTS models, each of which corresponds to a different voice. In some embodiments, the TTS module 294 is configured to perform transformations to cause the voice signal to be in a higher or lower frequency band, or speak faster or slower. In some embodiments, the TTS module 294 determines a frequency band of the original voice, and generates the voice signal based in part on pitch and/or other speaker characteristics, such as (but not limited to) the frequency band of the original voice. In some embodiments, the TTS module 294 selects a voice among multiple voices that has a frequency band closest to the frequency band of the original voice. In some embodiments, the TTS module 294 performs transformations to the translated voice signal to cause it to be in a frequency band of the original voice. In some embodiments, the TTS module 294 determines a speech speed of the original voice, and generates a translated voice based in part on the speech speed of the original voice, causing the original voice signal and translated voice signal to be time synchronized.

The sound filter module 280 spatializes multiple voice signals, including original voice signals and/or translated voice signals. In some embodiments, the sound filter module 280 causes an original voice signal to sound as if a source of the original voice signal were at a location further away than a source of the translated voice signal. In some embodiments, the sound filter module 280 attenuates the original voice signal, and/or enhances the translated signal to cause the translated voice signal to sound louder than the original voice signal. In some embodiments, the sound filter module 280 causes the original voice signal to phase out gradually, and causes the translated voice signal to phase in gradually.

In some embodiments, where there are multiple original voice signals, the sound filter module 280 may also spatialize the multiple translated voice signals. In some embodiments, the tracking module 260 tracks locations of sources of the multiple original voice signals relative to the user, and spatializes the translated voice signals based in part on the relative locations of the sources of the multiple original voices. For example, when a first source of a first original voice signal is further away from the user than a second source of a second original voice signal, the sound filter module 280 spatializes a first translated voice signal and a second translated voice signal, causing the first translated voice signal to sound as if it were to come from the first source, and causing the second translated voice signal to sound as if it were to come from the second source.

In some embodiments, the audio system 200 is configured to track movement of eyes of the user. The sound filter module 280 determines whether the user is looking at a particular source of a particular original voice signal. Responsive to determining that the user is looking at a particular source of a particular original voice signal, the sound filter module 280 causes the corresponding translated voice to sound louder than the rest of the original or translated voice signals. Alternatively, the sound filter module 280 causes the corresponding translated voice to sound closer than the rest of the original or translated voice signals. In some embodiments, the sound filter module 280 uses transfer function module 250 to perform various transformations on initially generated translated voice signals to spatialize them, and causes the transformed voices signals to be presented to the user.

In some embodiments, the original voice signal may be translated into more than one language and generate more than one translated voice signal. The more than one translated voice signals may be presented to the user. The user can choose to enhance, attenuate, or mute a particular translated voice signal, and/or an original voice signal. In some embodiments, the original voice signal from the sound source may be blocked or partially blocked by the headset 100 physically or via active noise cancellation technologies. Alternatively, the original voice signal may be reprojected by the headset 100 via the transducer arrays 210.

In some embodiments, the audio system 200 is configured to receive original text in a first language. In such a case, transcriber module 290 is not used. The translator module 292 translates the original text into translated text in a second language. In some embodiments, the original text may be obtained from a text file, such as a word document, a webpage, an email, an ebook, etc. Alternatively, or in addition, the original text may be obtained based on a captured image. For example, the audio system 200 may extract text from an image captured by an imaging device 130, e.g., via OCR.

The TTS module 294 generates a first voice signal based on the original text in the first language. The TTS module 294 also generates a second voice signal based on the translated text in the second language. In some embodiments, the TTS module 294 is configured to identify an author of the text and select a voice based on the identified author. For example, an author may be associated with a voice. The association may be set by the user or by the author. As another example, the audio system 200 may be able to retrieve a speech sample of the author, identify a frequency band of the author's voice, and select or generate a voice based on the frequency band of the author. In some embodiments, the speech sample may be included in metadata of the original text. In some embodiments, the speech sample may be obtained from a separate data source, such as a video or audio repository.

In some embodiments, the author may be identified based on the original text, e.g., "by John Smith," or based on metadata of the original text, e.g., modified by John Smith. In some embodiments, the author may be identified based on facial recognition. For example, a person hands the user a page of document, the audio system 200 may be able to identify the person based on facial recognition. When the user reads the page of document, the audio system 200 selects a voice based on the identification of the person.

In some embodiments, the TTS module 294 is also configured to adjust the speech speed of the first language and second language, causing the first language and the second language to be time synchronized. Notably, a same sentence in the first language and second language may include different number of syllables. The TTS module 294 is able to adjust the speech speed of the first voice and second voice to cause them to start and finish at around same times.

Again, sound filter module 280 can also spatialize the first voice and the second voice, and causes the spatialized first voice and second voice to be presented to the user simultaneously.

Figure 3:
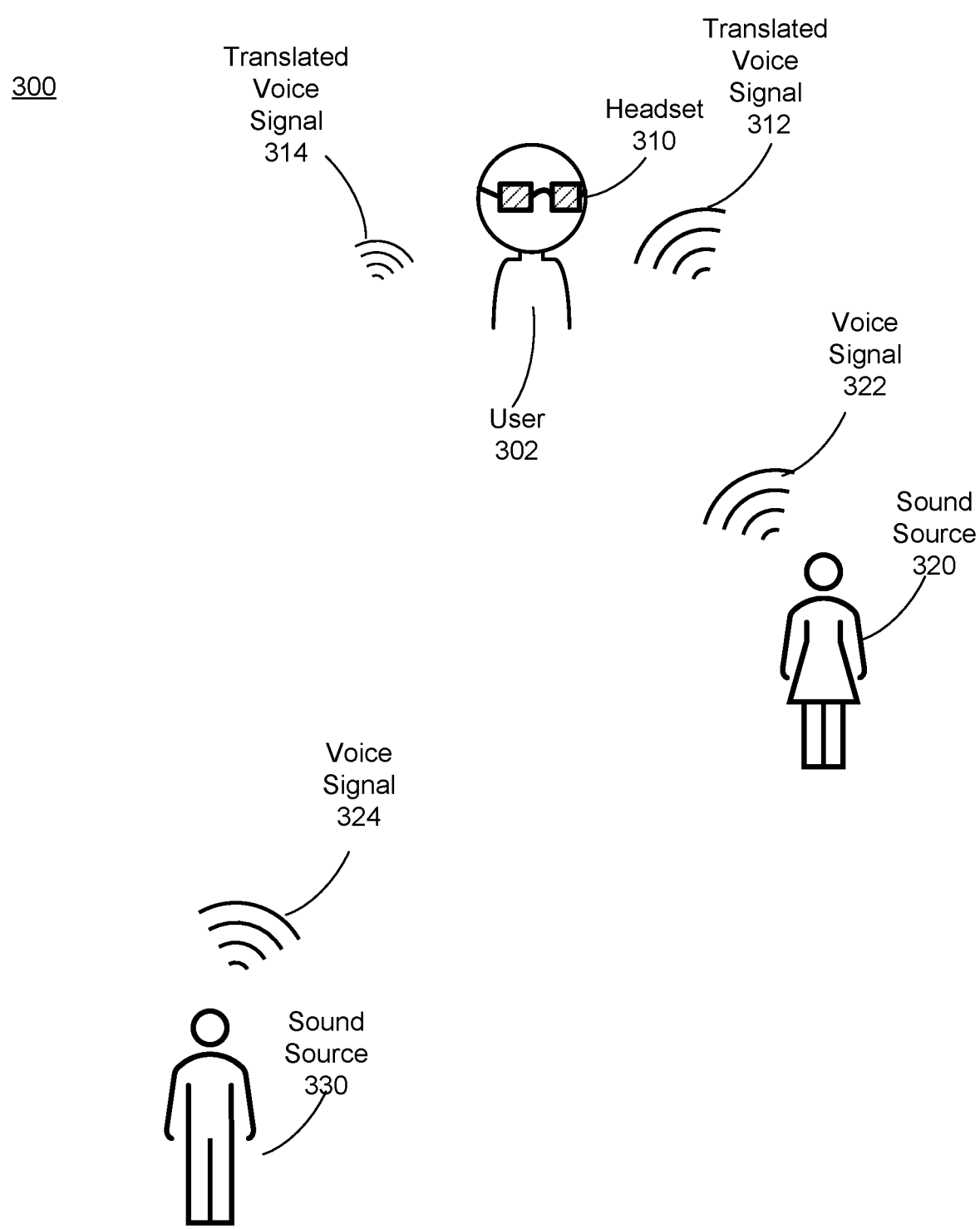
FIG. 3 illustrates an example environment, in which the audio system described herein may be implemented.

FIG. 3 illustrates an example environment 300, in which the audio system 200 described herein may be implemented. As illustrated in FIG. 3, a user 302 wears a headset 310 (the headset 310 may be the headset 100 or the headset 105), which includes the audio system 200 of FIG. 2. In the environment 300, there are two sound sources 320, 330 who are sources of a voice signal 322 and a voice signal 324, respectively. Assuming the two sound sources 320 and 330 both speak a foreign language that is foreign to the user 302. The audio system 200 receives the voice signal 322 and the voice signal 324, and processes them. The audio system 200 generates a voice signal 312 based in part on the voice signal 322, and generates a translated voice signal 314 based in part on the voice signal 324. The audio system 200 spatializes the translated voice signal 312 and the translated voice signal 314 based on locations of the sources of the voice signal 322 and the voice signal 324, respectively. The spatialization may be performed using sound filter module 280 and/or transfer function module 250.

In some embodiments, the audio system 200 uses the imaging device 130 to identify a relative location of the sound sources 320, 330 of the original voice signals 322, 324. In some embodiments, the audio system 200 provides a graphical user interface (GUI) that allows a user to indicate a location of each source of the original voice signal. For example, the GUI may show a virtual environment, and a user may be able to drag and drop a voice source to a particular location of the virtual environment. The sound filter module 280 spatializes the corresponding translated voice based in part on the user input.

Figure 4:
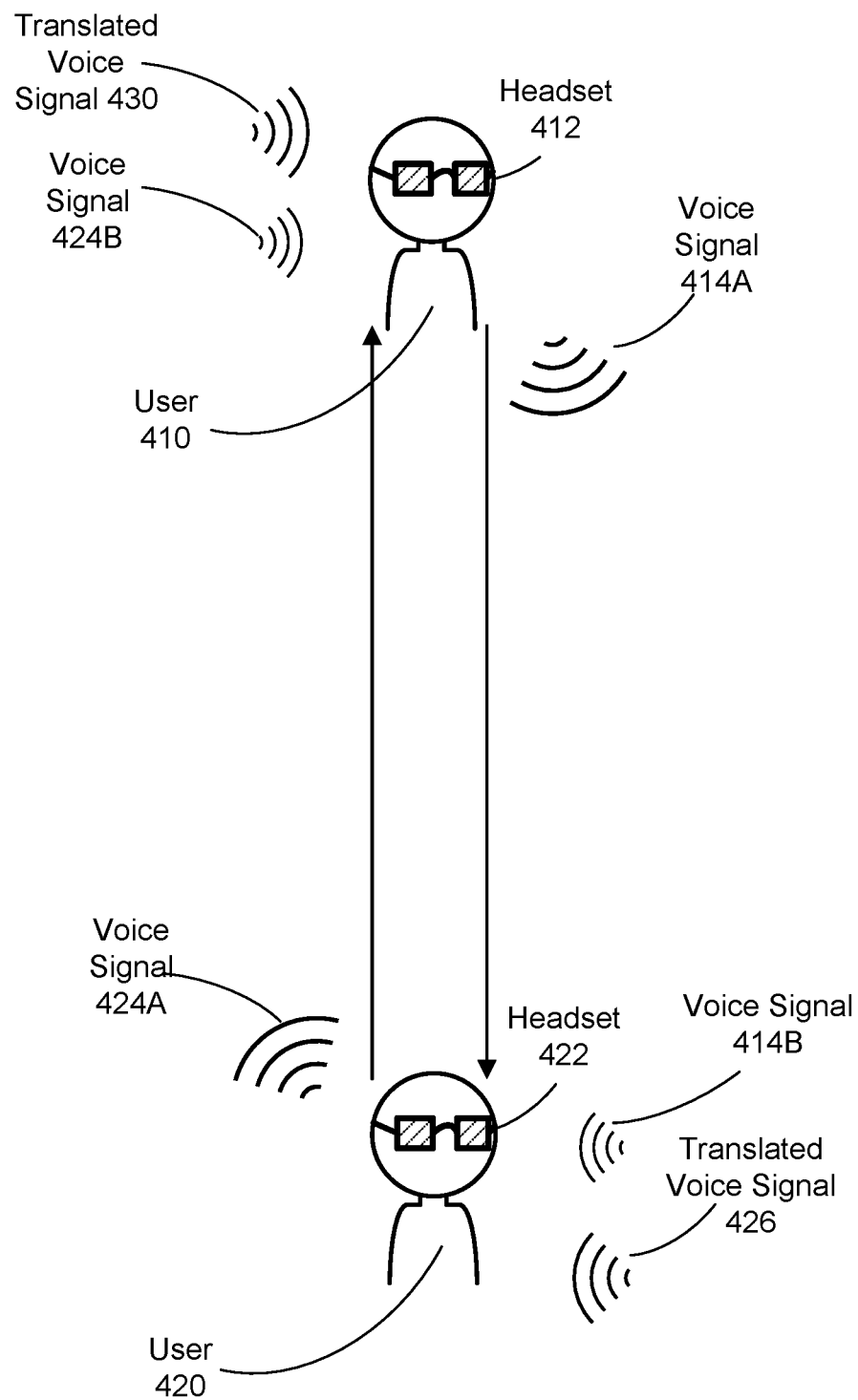
FIG. 4 illustrates another example environment, in which the audio system described herein may be implemented.

FIG. 4 illustrates another example environment 400, in which the audio system 200 described herein may be implemented. In the environment 400, a user 410 uses a headset 412 that includes an audio system that is an embodiment of the audio system 200, and a user 420 uses a headset 422 that includes an audio system that is an embodiment of the audio system 200. The user 410 speaks and generates a voice signal 414A in a first language, which is received by the headset 422 worn by the user 420. The audio system of the headset 422 processes the received voice signal 414A to generate a translated voice signal 426. The audio system of the headset 422 spatializes the voice signal 414A to form a voice signal 414B and spatializes the translated voice signal 426 and presents the voice signal 414B and the first translated voice signal 426 to the second user 420. The spatialization may include attenuating the voice signal 414B relative to the voice signal 414A detected by the audio system of the headset 422.

Similarly, the user 420 speaks and generates a voice signal 424A, which is received by the audio system of the headset 412. The audio system of the headset 412 processes the voice signal 424A to generate a translated voice signal 430. The audio system of the headset 412 spatializes the voice signal 424A to form a voice signal 424B and spatializes the second translated voice signal 426. The audio system of the headset 412 presents the voice signal 424B and the translated voice signal 430 to the user 410. The spatialization may include attenuating the voice signal 424B relative to the voice signal 424A detected by the audio system of the headset 412. In some embodiments, the users 410 and 420 may be located in a real environment or a virtual environment. The spatial relationship between users 410 and 420 may be based on their relative locations in the real environment or virtual environment, and the spatialization of the voice signals may be performed based on their relative locations in the corresponding environment.

In some embodiments, a headset (e.g., the headset 100, the headset 105, the headset 310, the headset 412, the headset 422, etc.) is configured to display text of the original voice signal and/or text of the translated voice signal. In some embodiments, the headset is configured to display the sources of voice signals in an artificial reality environment, and display the text associated with the voice signals and/or translated voice signals next to the sources of the original voice signals. In some embodiments, the sources of the voice signals may be next to the user of the headset, e.g., in a same room. In such a case, the virtual environment may be a mixed reality environment that is generated partially based in part on the real environment. In some embodiments, the sources of the original voice signals may be remote to the user of the headset, e.g., in a virtual conference, or a gaming environment. In such a case, the virtual environment may be generated by the virtual conference application or the gaming application.

Figure 5:
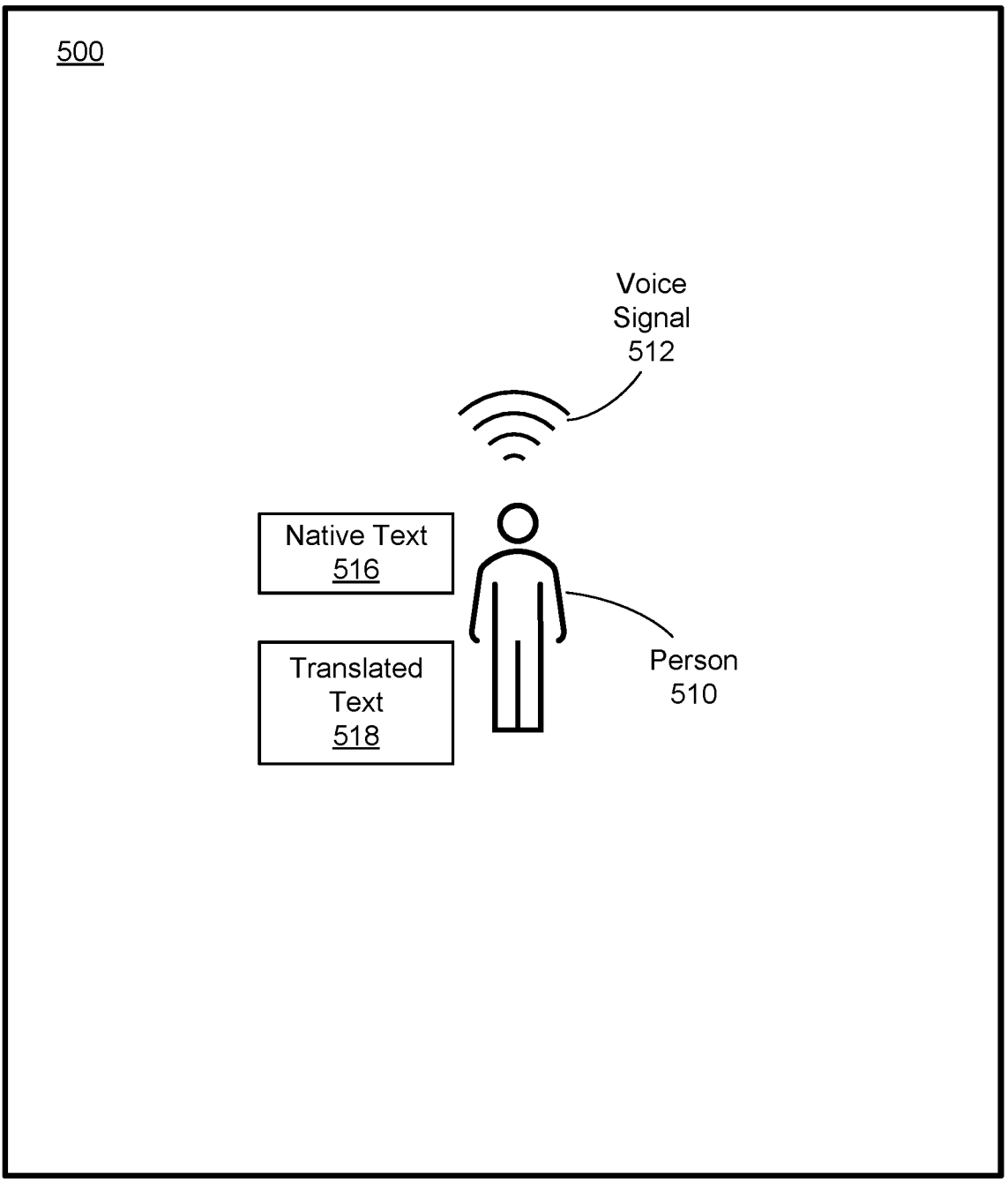
FIG. 5 illustrates an example graphical user interface (GUI) for displaying a virtual environment, in accordance with one or more embodiments.

FIG. 5 illustrates an example AR view 500 of a local area, in accordance with one or more embodiments. The view 500 may be, e.g., of a local area that is augmented with virtual objects (e.g., translated text that is overlaid on a real world scene via a display of a headset). The view 500 includes two persons 510, 520, which are sources of a voice signal 512 and a voice signal 522, respectively. The voice signal 512 (generated by the person 510) is transcribed (by the transcriber module 290) to native text (i.e., non-translated), and translated into a translated text. The native text is displayed by the headset as native text 516. And the translated text is displayed by the headset as translated text 518. In some embodiments, the native text 516 and/or the translated text 518 are displayed proximate to the person 510. In some embodiments, the positioning of one or both of the native text 516 and the translated text 518 is determined by the headset. For example, the headset may automatically display text proximate to a head of a speaker. In some embodiments, the user of the headset may adjust a position of where the native text 516 is presented, adjust a position of where the translated text 518 is presented, or both. In some embodiments, the user of the headset may also selectively enable and/or disable whether the headset presents the native text 516, whether the headset presents the translated text 518, or both. Note while a single person 510 is shown in the view 500. In some embodiments, if other sound sources are present (e.g., person, television, etc.) that are voice signals (i.e., speech)—the headset may also present translated and/or native text in a similar manner as described above for the person 510.

In some embodiments, the voice signal 512 may be translated to more than one language, and text in more than one translated languages may be displayed. The text in different language may be in different font, color, and/or size depending on the user's preference. The user may also choose to enhance or hide text in a particular language or text in foreign languages, and/or text associated with a particular person or sound source, etc.

Figure 6:
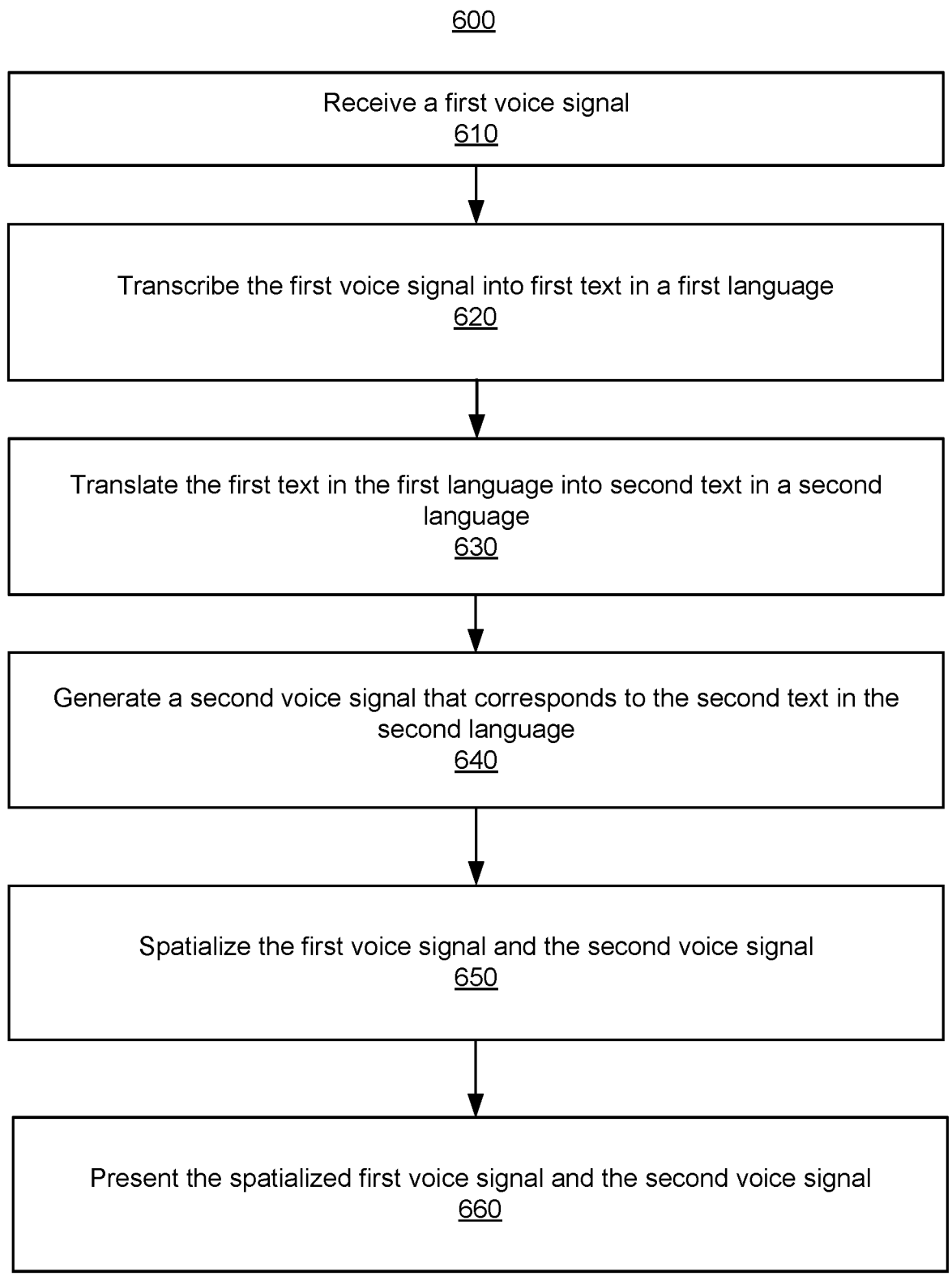
FIG. 6 is a flowchart of a method for spatializing an original voice signal and a translated voice signal, in accordance with one or more embodiments.

FIG. 6 is a flowchart of a method 600 for spatializing an original voice signal and a translated voice signal, in accordance with one or more embodiments. The process shown in FIG. 6 may be performed by components of an audio system (e.g., audio system 200). Other entities may perform some or all of the steps in FIG. 6 in other embodiments. Embodiments may include different and/or additional steps, or perform the steps in different orders.

The audio system 200 receives 610 a first voice signal. In some embodiments, a source of the first voice signal is near the audio system 200, and the first voice signal is detected by acoustic sensors in the sensor array 220 of the audio system. In some embodiments, the first voice signal is received from another device, e.g., another audio system, a headset, or a hand-held device. The source of the first voice signal may be another user of the other audio system, or the hand-held device. The user of the audio system 200 and the user of the other audio system may be in a virtual conference, a gaming environment, etc.

The audio system 200 transcribes 620 the first voice signal into first text in a first language. The audio system 200 may use a speech to text convertor to transcribe the text. In some embodiments, the audio system 200 may be able to detect the first language based in part on the first voice signal. In some embodiments, the audio system 200 may be able to detect the first language based on a user's current geolocation. In some embodiments, the first language is set by the user. In some embodiments, the audio system 200 accesses a machine learning model pretrained to transcribe voice signals of the first language into text of the first language.

The audio system 200 translates 630 the first text in the first language into second text in a second language. In some embodiments, the audio system 200 automatically sets the second language based on a system language of the audio system 200. In some embodiments, the user can set the second language manually. In some embodiments, the audio system 200 accesses a machine learning model pretrained to translate text in the first language to text in the second language.

The audio system 200 generates 640 a second voice signal that corresponds to the second text in the second language. In some embodiments, the audio system 200 determines a frequency band of the first voice signal and generates the second voice signal based in part on the frequency band. In some embodiments, the audio system 200 selects a voice from a plurality of voices that has a frequency band that is most close to frequency band of the first voice signal, and generates the second voice signal based in part on the selected voice. In some embodiments, the audio system 200 transforms the second voice signal to cause the second voice signal to be in the frequency band of the first voice signal. In some embodiments, the audio system 200 determines a speech speed of the first voice signal, and generates the second voice signal based in part on the speech speed associated with the first voice signal, causing the first voice signal and the second voice signal to be time synchronized.

The audio system 200 spatializes 650 the first voice signal and the second voice signal. In some embodiments, the first voice is spatialized to sound as if a source of the first voice signal were at a location further away from the user than a source of the second voice signal. In some embodiments, the first voice signal is attenuated. Alternatively, or in addition, the second voice signal is strengthened or enhanced. As such, the second voice signal sounds louder than the first voice signal. Depending on the need of the user, the audio system 200 could also spatialize the first voice to be sound as if the source of the first voice signal were at a location closer to the user than the source of the second voice signal.

The audio system 200 presents 660 or causes the spatialized first voice signal and the second voice signal to be presented to a user. In some embodiments, the spatialized first and second voice signals may be presented sequentially. Alternatively, the spatialized first and second voice signals may be presented at the same time.

Figure 7:
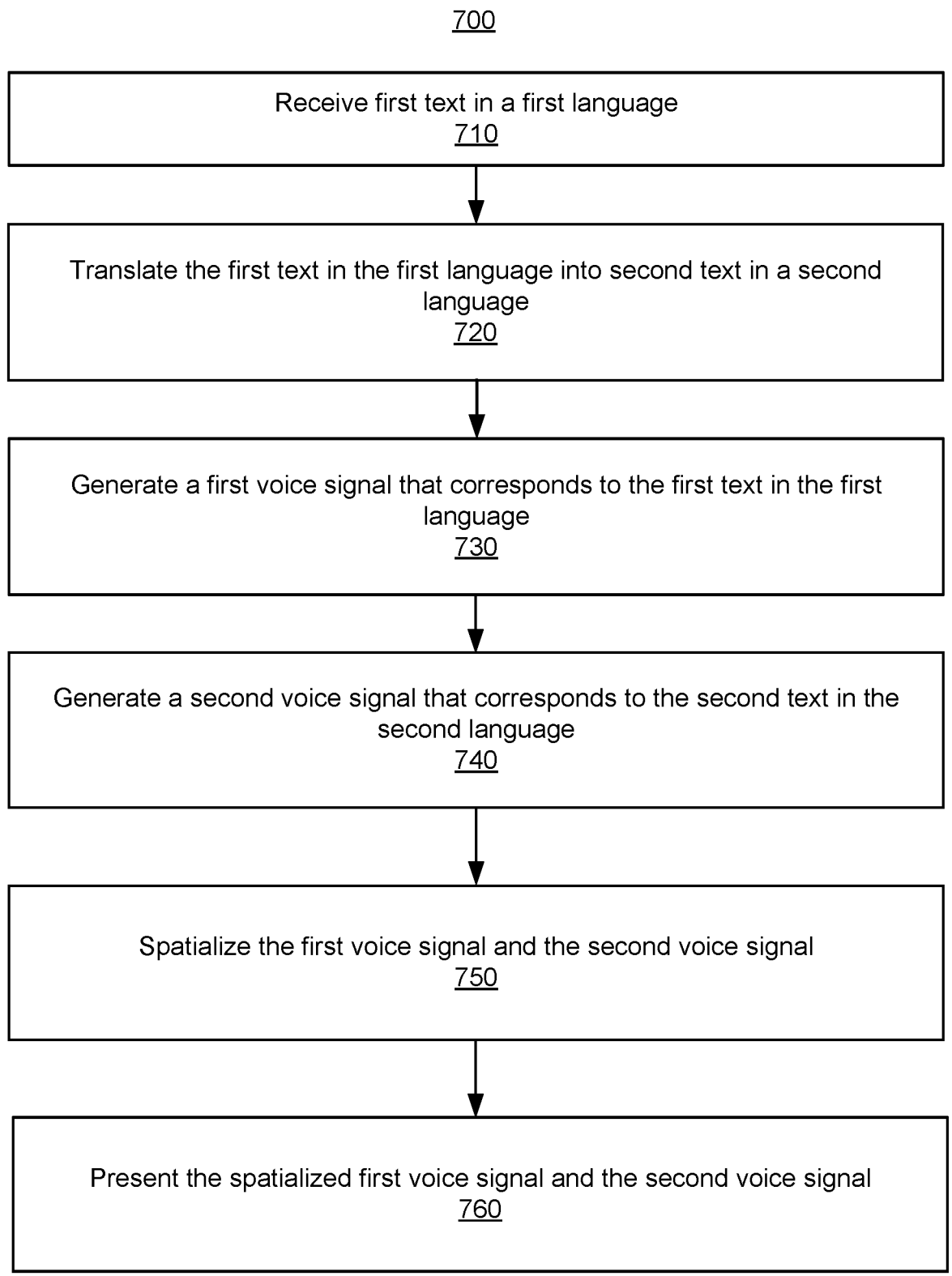
FIG. 7 is a flowchart of a method for generating and spatializing a first voice signal in a first language and a translated voice signal in a second language based on text, in accordance with one or more embodiments.

FIG. 7 is a flowchart of a method 700 for generating and spatializing a first voice signal in a first language and a translated voice signal in a second language based on text, in accordance with one or more embodiments. The process shown in FIG. 7 may be performed by components of an audio system (e.g., audio system 200). Other entities may perform some or all of the steps in FIG. 7 in other embodiments. Embodiments may include different and/or additional steps, or perform the steps in different orders.

The audio system 200 receives 710 first text in a first language. In some embodiments, the first text may be received as a text file, such as a document, an e-book, a webpage, etc. Alternatively, the first text may be generated based on an image. The image may be captured by the imaging device 130. The image may be (but is not limited to) a street sign, a restaurant menu, a page of paper document, a screen, etc. The audio system 200 is configured to extract text from the image, e.g., using optical character recognition (OCR).

The audio system 200 translates 720 the first text in the first language into second text in a second language. The audio system 200 may access a machine learning model pretrained to translate texts in the first language to text in the second language, and applies the machine learning model to the first text.

The audio system 200 generates 730 a first voice signal that corresponds to the first text in the first language and generates 740 a second voice signal that corresponds to the second text in the second language. The audio system 200 may access a first machine learning model pretrained to convert text in the first language to voice signals, and applies the first machine learning model to the first text to generate the first voice signal. The audio system 200 may access a second machine learning model pretrained to convert text in the second language to voice signals, and apply the second machine learning model to the second text to generate the second voice signal.

The audio system 200 may also select a voice based on various parameters. In some embodiments, the audio system 200 may select a voice that is the closest to the user's voice. In some embodiments, the audio system 200 may identify an author of the first text, and select a voice based on the identified author. For example, for an e-book, the author's voice may be known, and the audio system 200 may select a voice that is the closest to the author's voice. As another example, the user may map a particular person to a particular voice. When the audio system 200 determines that the first text is authored by a particular person, the audio system 200 selects the user-mapped voice to generate the first and second voice signals. In some embodiments, the audio system 200 identifies an author based on the received text. For example, the author may be indicated in the text itself, e.g., "by John Smith." Alternatively, in some cases, the author may be indicated in metadata of the text file, e.g., modified by John Smith. In some embodiments, the audio system 200 identifies an author based on motion between the author and the user. For example, when the author hands a page of document to the user, and the user is reading the page of document, the audio system may identify the author based on facial features of the author.

The audio system 200 spatializes 750 the first voice signal and the second voice signal. The audio system 200 presents 760 the spatialized first voice signal and the second voice signal to a user. Similar to the spatialization step 650 of method 600, different spatializations may be applied to the first voice signal and the second voice signal. For example, the first voice signal may be transformed to sound as if it were from a source that is further from the user than a source of the second voice signal.

Figure 8:
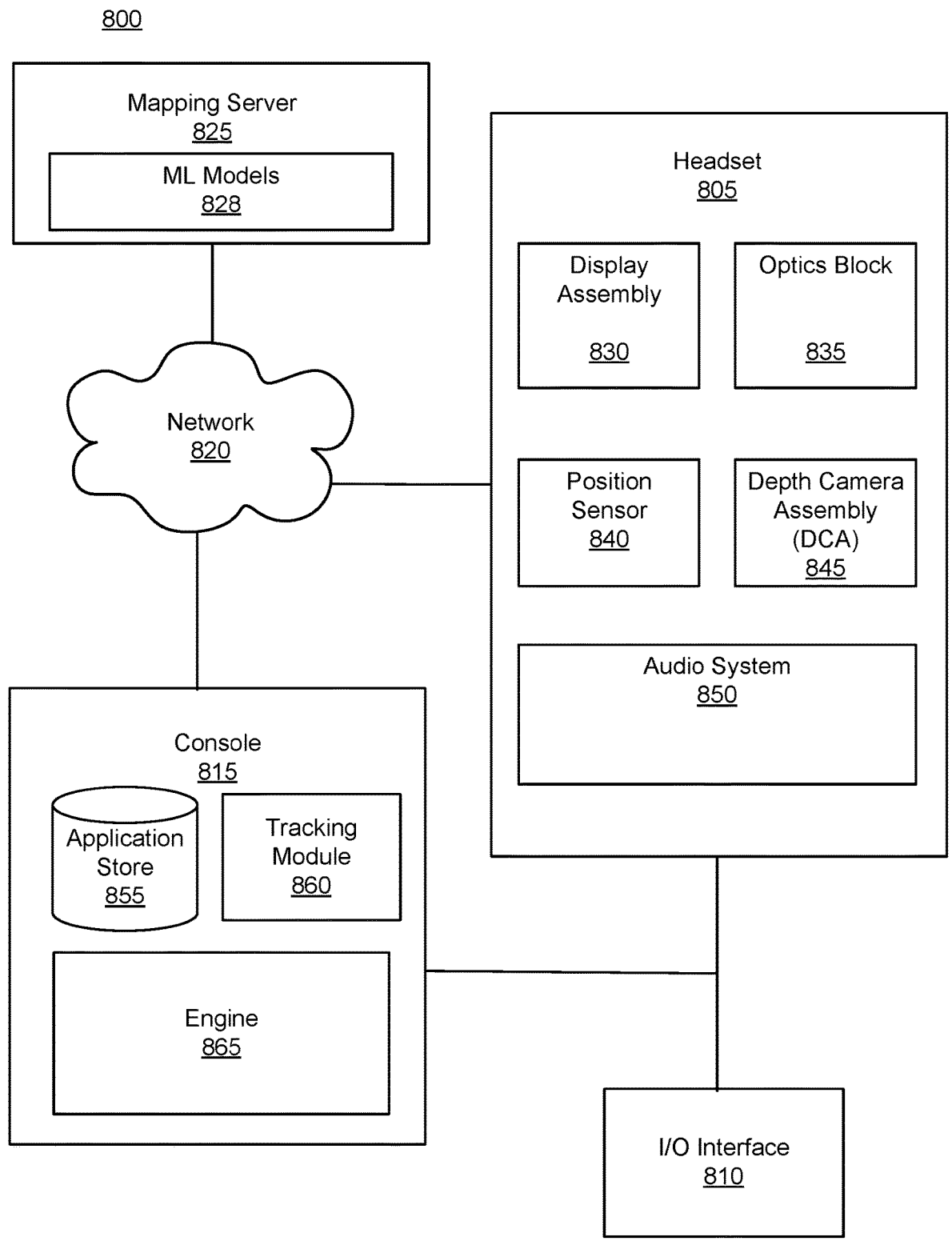
FIG. 8 is an audio system that includes a headset, in accordance with one or more embodiments.

FIG. 8 is an audio system 800 that includes a headset 805, in accordance with one or more embodiments. In some embodiments, the headset 805 may be the headset 100 of FIG. 1A or the headset 105 of FIG. 1B. The audio system 800 may operate in an artificial reality environment (e.g., a virtual reality environment, an augmented reality environment, a mixed reality environment, or some combination thereof). The audio system 800 shown by FIG. 8 includes the headset 805, an input/output (I/O) interface 810 that is coupled to a console 815, the network 820, and the mapping server 825. While FIG. 8 shows an example system 800 including one headset 805 and one I/O interface 810, in other embodiments any number of these components may be included in the audio system 800. For example, there may be multiple headsets each having an associated I/O interface 810, with each headset and I/O interface 810 communicating with the console 815. In alternative configurations, different and/or additional components may be included in the audio system 800. Additionally, functionality described in conjunction with one or more of the components shown in FIG. 8 may be distributed among the components in a different manner than described in conjunction with FIG. 8 in some embodiments. For example, some or all of the functionality of the console 815 may be provided by the headset 805.

The headset 805 includes the display assembly 830, an optics block 835, one or more position sensors 840, and the DCA 845. Some embodiments of headset 805 have different components than those described in conjunction with FIG. 8. Additionally, the functionality provided by various components described in conjunction with FIG. 8 may be differently distributed among the components of the headset 805 in other embodiments, or be captured in separate assemblies remote from the headset 805.

The display assembly 830 displays content to the user in accordance with data received from the console 815. The display assembly 830 displays the content using one or more display elements (e.g., the display elements 120). A display element may be, e.g., an electronic display. In various embodiments, the display assembly 830 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 835.

The optics block 835 may magnify image light received from the electronic display, corrects optical errors associated with the image light, and presents the corrected image light to one or both eyeboxes of the headset 805. In various embodiments, the optics block 835 includes one or more optical elements. Example optical elements included in the optics block 835 include: an aperture, a Fresnel lens, a convex lens, a concave lens, a filter, a reflecting surface, or any other suitable optical element that affects image light. Moreover, the optics block 835 may include combinations of different optical elements. In some embodiments, one or more of the optical elements in the optics block 835 may have one or more coatings, such as partially reflective or anti-reflective coatings.

Magnification and focusing of the image light by the optics block 835 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 835 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 835 corrects the distortion when it receives image light from the electronic display generated based in part on the content.

The position sensor 840 is an electronic device that generates data indicating a position of the headset 805. The position sensor 840 generates one or more measurement signals in response to motion of the headset 805. The position sensor 190 is an embodiment of the position sensor 840. Examples of a position sensor 840 include: one or more IMUs, one or more accelerometers, one or more gyroscopes, one or more magnetometers, another suitable type of sensor that detects motion, or some combination thereof. The position sensor 840 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 805 from the sampled data. For example, the IMU integrates the measurement signals received from the accelerometers over time to estimate a velocity vector and integrates the velocity vector over time to determine an estimated position of a reference point on the headset 805. The reference point is a point that may be used to describe the position of the headset 805. While the reference point may generally be defined as a point in space, however, in practice the reference point is defined as a point within the headset 805.

The DCA 845 generates depth information for a portion of the local area. The DCA includes one or more imaging devices and a DCA controller. The DCA 845 may also include an illuminator. Operation and structure of the DCA 845 is described above with regard to FIG. 1A.

The audio system 850 provides audio content to a user of the headset 805. The audio system 850 is substantially the same as the audio system 200 describe above. The audio system 850 may comprise one or acoustic sensors, one or more transducers, and an audio controller. The audio system 850 may provide spatialized audio content to the user. In particular, the audio system 850 is able to translate an original voice signal in a first language into a translated voice signal in a second language, spatialize the original voice signal and the translated voice signal, and provide the spatialized original voice signal and translated voice signal to the user.

In some embodiments, the audio system 850 may request acoustic parameters from the mapping server 825 over the network 820. The acoustic parameters describe one or more acoustic properties (e.g., room impulse response, a reverberation time, a reverberation level, etc.) of the local area. The audio system 850 may provide information describing at least a portion of the local area from e.g., the DCA 845 and/or location information for the headset 805 from the position sensor 840. The audio system 850 may generate one or more sound filters using one or more of the acoustic parameters received from the mapping server 825, and use the sound filters to provide audio content to the user.

In some embodiments, the mapping server 825 also include machine learning models 828. The machine learning models 828 may include transcriber models configured to transcribe the original voice signal in the first language into text in the first language. The machine learning models 828 may also include translation models configured to translate text in the first language into text in the second language. The machine learning models 828 may also include TTS models configured to convert text in the second language into the second voice signal in the second language. The machine learning models 828 may include multiple transcriber models, multiple translation models, and/or multiple TTS models, each of which corresponding to a particular language, or a particular pair of languages.

In some embodiments, the audio system 850 sends the received original voice signal to the mapping server 825, causing the mapping server 825 to select and apply proper machine learning models to the original voice signal to generate the translated voice signal. The mapping server 825 sends the translated voice signal back to the audio system 850, causing the audio system 850 to provide the translated voice signal to the user.

In some embodiments, the audio system 850 sends a request indicating the first language and the second language to the mapping server 825, causing the mapping server 825 to send machine learning models corresponding to the first language and the second language to the audio system 850. The audio system 850 applies the received machine learning models to the received original voice signal to generate the translated voice signal.

The I/O interface 810 is a device that allows a user to send action requests and receive responses from the console 815. An action request is a request to perform a particular action. For example, an action request may be an instruction to start or end capture of image or video data, or an instruction to perform a particular action within an application. The I/O interface 810 may include one or more input devices. Example input devices include: a keyboard, a mouse, a game controller, or any other suitable device for receiving action requests and communicating the action requests to the console 815. An action request received by the I/O interface 810 is communicated to the console 815, which performs an action corresponding to the action request. In some embodiments, the I/O interface 810 includes an IMU that captures calibration data indicating an estimated position of the I/O interface 810 relative to an initial position of the I/O interface 810. In some embodiments, the I/O interface 810 may provide haptic feedback to the user in accordance with instructions received from the console 815. For example, haptic feedback is provided when an action request is received, or the console 815 communicates instructions to the I/O interface 810 causing the I/O interface 810 to generate haptic feedback when the console 815 performs an action.

The console 815 provides content to the headset 805 for processing in accordance with information received from one or more of: the DCA 845, the headset 805, and the I/O interface 810. In the example shown in FIG. 8, the console 815 includes an application store 855, a tracking module 860, and an engine 865. Some embodiments of the console 815 have different modules or components than those described in conjunction with FIG. 8. Similarly, the functions further described below may be distributed among components of the console 815 in a different manner than described in conjunction with FIG. 8. In some embodiments, the functionality discussed herein with respect to the console 815 may be implemented in the headset 805, or a remote system.

The application store 855 stores one or more applications for execution by the console 815. An application is a group of instructions, that when executed by a processor, generates content for presentation to the user. Content generated by an application may be in response to inputs received from the user via movement of the headset 805 or the I/O interface 810. Examples of applications include: gaming applications, conferencing applications, video playback applications, or other suitable applications.

The tracking module 860 tracks movements of the headset 805 or of the I/O interface 810 using information from the DCA 845, the one or more position sensors 840, or some combination thereof. For example, the tracking module 860 determines a position of a reference point of the headset 805 in a mapping of a local area based on information from the headset 805. The tracking module 860 may also determine positions of an object or virtual object. Additionally, in some embodiments, the tracking module 860 may use portions of data indicating a position of the headset 805 from the position sensor 840 as well as representations of the local area from the DCA 845 to predict a future location of the headset 805. The tracking module 860 provides the estimated or predicted future position of the headset 805 or the I/O interface 810 to the engine 865.

The engine 865 executes applications and receives position information, acceleration information, velocity information, predicted future positions, or some combination thereof, of the headset 805 from the tracking module 860. Based in part on the received information, the engine 865 determines content to provide to the headset 805 for presentation to the user. For example, if the received information indicates that the user has looked to the left, the engine 865 generates content for the headset 805 that mirrors the user's movement in a virtual local area or in a local area augmenting the local area with additional content. Additionally, the engine 865 performs an action within an application executing on the console 815 in response to an action request received from the I/O interface 810 and provides feedback to the user that the action was performed. The provided feedback may be visual or audible feedback via the headset 805 or haptic feedback via the I/O interface 810.

The network 820 couples the headset 805 and/or the console 815 to the mapping server 825. The network 820 may include any combination of local area and/or wide area networks using both wireless and/or wired communication systems. For example, the network 820 may include the Internet, as well as mobile telephone networks. In one embodiment, the network 820 uses standard communications technologies and/or protocols. Hence, the network 820 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 820 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 820 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 825 may include a database that stores a virtual model describing a plurality of spaces, wherein one location in the virtual model corresponds to a current configuration of a local area of the headset 805. The mapping server 825 receives, from the headset 805 via the network 820, information describing at least a portion of the local area and/or location information for the local area. The user may adjust privacy settings to allow or prevent the headset 805 from transmitting information to the mapping server 825. The mapping server 825 determines, based in part on the received information and/or location information, a location in the virtual model that is associated with the local area of the headset 805. The mapping server 825 determines (e.g., retrieves) one or more acoustic parameters associated with the local area, based in part on the determined location in the virtual model and any acoustic parameters associated with the determined location. The mapping server 825 may transmit the location of the local area and any values of acoustic parameters associated with the local area to the headset 805.

One or more components of system 800 may contain a privacy module that stores one or more privacy settings for user data elements. The user data elements describe the user or the headset 805. For example, the user data elements may describe a physical characteristic of the user, an action performed by the user, a location of the user of the headset 805, a location of the headset 805, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The audio system 800 may include one or more authorization/privacy servers for enforcing privacy settings. A request from an entity for a particular user data element may identify the entity associated with the request and the user data element may be sent only to the entity if the authorization server determines that the entity is authorized to access the user data element based in part on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising:
   transcribing, via a sensor of a headset frame, a first voice signal into first text in a first language;
   translating the first text in the first language into second text in a second language;
   generating, via an audio controller of the headset frame, a second voice signal that corresponds to the second text in the second language;
   spatializing the first voice signal and the second voice signal, relative to a user wearing the headset frame; and
   presenting, via speakers of the headset frame, the spatialized first voice signal and the second voice signal.

2. The method of claim 1, wherein the spatialized first voice signal and the second voice signal are presented at a same time.

3. The method of claim 1, wherein spatializing the first voice signal and the second voice signal comprises:
   spatializing the first voice signal to sound as if a source of the first voice signal were at a location further away from a user than a source of the second voice signal.

4. The method of claim 1 wherein spatializing the first signal and the second signal includes:
   causing the second voice signal to sound louder than the first voice signal.

5. The method of claim 1, wherein generating a second voice signal comprises:
   determining a frequency band associated with the first voice signal; and
   generating the second voice signal based in part on the frequency band associated with the first voice signal.

6. The method of claim 5, wherein generating a second voice signal comprises:
   selecting a voice from a plurality of voices that has a frequency band that is most close to frequency band of the first voice signal; and
   generating the second voice signal based in part on the selected voice.

7. The method of claim 1, wherein generating a second voice signal comprises:
   determining a speech speed associated with the first voice signal; and
   generating the second voice signal based in part on the speech speed associated with the first voice signal, wherein the first voice signal and second voice signal are time synchronized.

8. The method of claim 1, wherein the method further comprises:

displaying the first text in the first language and the second text in the second language.

9. The method of claim 1, wherein the method further comprises:
receiving a third voice signal;
transcribing the third voice signal into third text in the first language;
translating the third text in the first language into fourth text in a second language;
generating a fourth voice signal that corresponds to the fourth text in the second language; and
presenting at least the second voice signal and the fourth voice signal.

10. The method of claim 9, wherein the method further comprises:
spatializing the second voice signal and the fourth voice signal based on locations of sources of the first voice signal and the third voice signal relative to a user.

11. The method of claim 10, wherein spatializing the second voice signal and the fourth voice signal comprises:
determining that the source of the first voice signal is closer to or further from the user compared to the source of the third voice signal; and
spatializing the second voice signal and the fourth voice signal based in part on the determination.

12. The method of claim 10, wherein the method further comprises:
tracking movement of eyes of a user;
determining whether the user is looking at the source of the first voice signal or the source of the second voice signal;
responsive to determining that the user is looking at the source of the first voice signal, causing the second voice signal to sound louder than the fourth voice signal; and
responsive to determining that the user is looking at the source of the third voice signal, causing the fourth voice signal to sound louder than the second voice signal.

13. A non-transitory computer-readable medium having instructions encoded thereon that, when executed by a processor of a headset, cause the headset to:
transcribe, via a sensor of a headset frame, a first voice signal into first text in a first language;
translate the first text in the first language into second text in a second language;
generate, via an audio controller of the headset frame, a second voice signal that corresponds to the second text in the second language;
spatialize the first voice signal and the second voice signal, relative to a user wearing the headset frame; and
present, via speakers of the headset frame, the spatialized first voice signal and the second voice signal.

14. The non-transitory computer-readable medium of claim 13, wherein the first voice signal and the second voice signal are presented at a same time.

15. The non-transitory computer-readable medium of claim 13 having additional instructions encoded thereon that, when executed by the processor, cause the headset to:
spatialize the first voice signal to sound as if a source of the first voice signal were at a location further away from a user than a source of the second voice signal.

16. The non-transitory computer-readable medium of claim 13 having additional instructions encoded thereon that, when executed by the processor, cause the headset to:
cause the second voice signal to sound louder than the first voice signal.

17. The non-transitory computer-readable medium of claim 13 having additional instructions encoded thereon that, when executed by the processor, cause the headset to:
determine a frequency band associated with the first voice signal; and
generate the second voice signal based in part on the frequency band associated with the first voice signal.

18. The non-transitory computer-readable medium of claim 16 having additional instructions encoded thereon that, when executed by the processor, cause the processor to:
select a voice from a plurality of voices that has a frequency band that is most close to frequency band of the first voice signal; and
generate the second voice signal based in part on the selected voice.

19. The non-transitory computer-readable medium of claim 13 having additional instructions encoded thereon that, when executed by the processor, cause the headset to:
receive a third voice signal;
transcribe the third voice signal into third text in the first language;
translate the third text in the first language into fourth text in a second language;
generate a fourth voice signal that corresponds to the fourth text in the second language; and
present at least the second voice signal and the fourth voice signal at a same time.

20. An audio system comprising:
a transducer array configured to present sound to a user; and
an audio controller configured to:
translate first text in a first language into second text in a second language;
generate a first voice signal that corresponds to the first text in the first language;
generate, via the audio controller of a headset frame, a second voice signal that corresponds to the second text in the second language;
spatialize the first voice signal and the second voice signal, relative to a user wearing the headset frame; and
provide, via speakers of the headset frame, the spatialized first voice signal and the second voice signal to transducer array, causing the transducer array to present the spatialized first voice signal and the second voice signal to the user.

* * * * *